United States Patent
Britton et al.

(10) Patent No.: US 6,535,896 B2
(45) Date of Patent: Mar. 18, 2003

(54) SYSTEMS, METHODS AND COMPUTER PROGRAM PRODUCTS FOR TAILORING WEB PAGE CONTENT IN HYPERTEXT MARKUP LANGUAGE FORMAT FOR DISPLAY WITHIN PERVASIVE COMPUTING DEVICES USING EXTENSIBLE MARKUP LANGUAGE TOOLS

(75) Inventors: Kathryn H. Britton, Chapel Hill, NC (US); Steve Dale Ims, Apex, NC (US); Brad B. Topol, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,935

(22) Filed: Jan. 29, 1999

(65) Prior Publication Data

US 2002/0059344 A1 May 16, 2002

(51) Int. Cl.[7] ................................................ G06F 17/00
(52) U.S. Cl. ........................ 707/523; 707/522; 707/513
(58) Field of Search .............................. 707/501.1, 517, 707/523, 513, 100, 101, 522, 511–512, 203

(56) References Cited

U.S. PATENT DOCUMENTS

| | | | |
|---|---|---|---|
| 5,745,360 A | | 4/1998 | Leone et al. ................. 364/140 |
| 5,805,159 A | | 9/1998 | Bertram et al. .............. 345/339 |
| 5,819,302 A | * | 10/1998 | Nielsen ....................... 707/512 |
| 5,848,415 A | * | 12/1998 | Guck ........................... 707/10 |
| 5,991,782 A | * | 11/1999 | Miyagawa et al. .......... 707/511 |
| 6,014,680 A | * | 1/2000 | Sato et al. .................... 707/513 |
| 6,061,697 A | * | 5/2000 | Nakao ......................... 707/203 |
| 6,085,196 A | * | 7/2000 | Motoyama et al. .......... 707/102 |
| 6,167,409 A | * | 12/2000 | DeRose et al. ............... 707/10 |
| 6,182,092 B1 | * | 1/2001 | Francis et al. .............. 707/513 |
| 6,202,072 B1 | * | 3/2001 | Kuwahara ................... 707/513 |
| 6,226,642 B1 | * | 5/2001 | Beranek et al. ............. 707/10 |
| 6,263,332 B1 | * | 7/2001 | Nasr et al. ................... 707/104.1 |
| 6,336,124 B1 | * | 1/2002 | Alam et al. .................. 707/523 |
| 6,397,219 B2 | * | 5/2002 | Mills ........................... 707/10 |
| 6,418,441 B1 | * | 7/2002 | Call ............................. 705/23 |
| 6,424,979 B1 | * | 7/2002 | Livingston et al. .......... 707/511 |
| 6,430,624 B1 | * | 8/2002 | Jamtgaard et al. .......... 709/246 |

OTHER PUBLICATIONS

Cseri, Istvan. Building XML Parsers for Microsoft's IE4, http://www.xml.com/pub/a/w3j/s3.paoli.html, Oct. 2, 1997. pp. 1–11.*

Walter, Mark. Microsoft releases preview of XSL Style Processor, http://www.xml.com/pub/a/SeyboldReport/ip020601.html, Feb. 20, 1998. pp. 1–3.*

Alschuler, Liora, SGML looks around the corner in Barcelona, sees XML. GCA Conference. The Gale Group. Seybold Report on Publishing Systems, v26, n20, p. 34 (10 pages). Jul. 4, 1997.*

Alexander, George. "SGML gets a new leas on life at DC conference" Seybold Report on Publishing Systems. vol. 27, No. 9, p. 25(26): Jan. 10, 1998.*

Alschuler, Lioria and Alexander, George. "Coming of age in cyberspace: births, deaths, and milestones at SGML/XML '97" Seybold Report on Publishing Systems. vol. 2, No. 5, p. 21(14): Jan., 1998.*

Prescod, Paul. "XML: the intersection of documents and databases on the Internet" Databased Web Advisor, v15, n12, p 36(4): Dec., 1997.*

* cited by examiner

Primary Examiner—Joseph H. Feild
(74) Attorney, Agent, or Firm—Myers Bigel Sibley & Sajovec; Jeanine S. Ray-Yarletts

(57) ABSTRACT

Systems, methods and computer program products are provided for utilizing XML-based tools to tailor HTML-based Web page content for display within various client devices. Content portions of a requested Web page are converted to an XML format and then modified using an XML content-tailoring tool. Other content portions of the Web page are masked so as to be "hidden" and are, thus, not converted to XML format. The masked portions of the Web page are then unmasked, combined with the modified content portions, and transmitted to a client device for display therewithin.

42 Claims, 2 Drawing Sheets

SYSTEMS, METHODS AND COMPUTER PROGRAM PRODUCTS FOR TAILORING WEB PAGE CONTENT IN HYPERTEXT MARKUP LANGUAGE FORMAT FOR DISPLAY WITHIN PERVASIVE COMPUTING DEVICES USING EXTENSIBLE MARKUP LANGUAGE TOOLS

FIELD OF THE INVENTION

The present invention relates generally to Web pages and, more particularly, to displaying Web pages.

BACKGROUND OF THE INVENTION

The Internet is a worldwide decentralized network of computers having the ability to communicate with each other. The Internet has gained broad recognition as a viable medium for communicating and interacting across multiple networks. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher, and content formats including plain text, Extensible Markup Language (XML), as well as image formats such as Graphics Interchange Format (GIF) and Joint Photographic Experts Group (JPEG).

An intranet is a private computer network conventionally contained within an enterprise and that conventionally includes one or more servers in communication with multiple user computers. An intranet may be comprised of interlinked local area networks and may also use leased-lines in a wide-area network. An intranet may or may not include connections to the outside Internet. Intranets conventionally utilize various Internet protocols and, in general, often look like private versions of the Internet. An intranet user conventionally accesses an intranet server via a Web browser running locally on his/her computer.

Exemplary Web browsers for both Internet and intranet use include Netscape Navigator® (Netscape Communications Corporation, Mountain View, Calif.) and Internet Explorers® (Microsoft Corporation, Redmond, Wash.). Web browsers typically provide a graphical user interface for retrieving and viewing Web pages, applications, and other resources hosted by Internet/intranet servers (hereinafter collectively referred to as "Web servers").

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other Web servers and files. When a user selects a particular hypertext link, a Web browser reads and interprets an address, called a Uniform Resource Locator (URL) associated with the link, connects the Web browser with a Web server at that address, and makes a request (e.g., an HTTP request) for the file identified in the link. The Web server then sends the requested file to the Web client which the Web browser interprets and displays to the user.

With the increasing mobility of today's society, the demand for mobile computing capabilities has also increased. Many workers and professionals are downsizing their laptop computers to smaller palm-top or hand-held devices, such as personal digital assistants (PDAs). In addition, many people are utilizing cellular telephones to access the Internet, to access intranets, and to perform various other computing functions. Computing devices including, but not limited to, PDAs, cellular telephones, and computing devices utilized within appliances and automobiles, are often collectively referred to as "pervasive" computing devices. Many pervasive computing devices utilize the Microsoft® Windows CE and 3Com Palm Computing® platforms.

Unfortunately, pervasive computing devices typically have displays that are small in size compared with desktop computer displays. As a result, content portions of a Web page, such as images and text that are otherwise displayable on a desktop computer display, may not be displayable on a pervasive computing device display unless some modifications to the images and/or text (i.e., the content) are made. For example, a desktop computer display having an array of 1024 pixels by 768 pixels may be able to display a large (e.g., 2 megabit), 24 bit per pixel color image. A pervasive computing device with a display having an array of 120 pixels by 120 pixels, and with the ability to display only about 3 bits per pixel, may ignore much of the image data. As a result the image may not be displayed properly, if at all, via the pervasive computing device display unless the size of the image is reduced.

Text font and size within a Web page may also need to be changed to permit the display thereof within a pervasive computing device display. In addition, performance limitations of pervasive computing devices, such as memory size and connection bandwidth, may also require changes to Web page content for proper display thereof via a pervasive computing device.

Accordingly, it is desirable to have techniques that permit Web page content to be modified and presented in custom-tailored formats for various types of pervasive computing devices. As described above, this may include removing or shrinking of images. This may also include the creation of summary pages of headings, or in some cases, conversion of HTML to dialects such as Compressed Markup Language (CML) or Wireless Markup Language (WML).

A growing number of Web pages are being written in the Extensible Markup Language (XML). For example, dynamically generated Web pages, which intermix data retrieved at run-time with static page layout commands, are often generated using XML. Various XML tools have also been developed to perform "content tailoring" of Web pages to enable display thereof via pervasive computing devices. These content tailoring tools can work well with Web pages in XML format. Unfortunately, these content tailoring tools may not work well with some Web pages in HTML format. Content tailoring tools typically expect a well-formed, regular document that follows XML rules (i.e., with all start tags matched by end tags, all parameters in a standard format, etc.). HTML documents often break many of these rules, and may have many irregularities of format that are not specifically allowed by HTML, but are tolerated by browsers.

Because many in the business community see XML as a standard format for data transfer, XML Web pages are becoming more prevalent. However, it is considered unlikely that either existing Web pages written in HTML or popular HTML authoring tools will be ported to XML at the same rate that new XML Web pages are being created. Accordingly, there is expected to be a transition period wherein Web pages may contain a mixture of HTML-formatted content and XML-formatted content.

Accordingly, there is a need for content tailoring tools that can be used with Web pages written in XML and HTML, as well as Web pages written in a mixture of XML and HTML. Furthermore, some existing Web browsers may not be able to properly display Web pages written in both XML and HTML. Accordingly, there is currently a need for modifying Web pages having a mixture of XML and HTML formats so as to be displayable within current Web browsers.

SUMMARY OF THE INVENTION

In view of the above discussion, it is an object of the present invention to facilitate content tailoring of Web pages written in HTML using XML-based content tailoring tools.

It is another object of the present invention to facilitate the display of Web pages written in HTML and XML within current Web browsers.

It is another object of the present invention to facilitate the display of Web pages via pervasive computing devices that may have smaller displays and various performance limitations as compared with desktop computing devices.

These and other objects of the present invention are provided by systems, methods and computer program products for utilizing XML-based tools to tailor HTML-based Web page content for display within various client devices. According to the present invention, a client device, such as a pervasive computing device, requests a Web page that contains one or more portions that require tailoring for display within the requesting client device. These portions, which are typically in HTML format, but can be in other formats, are converted to an XML format. Other portions of the Web page are masked so as to be "hidden" and are, thus, not converted to XML format.

The portions of the Web page converted to an XML format are then modified, using an XML content-tailoring tool, so that the content can be properly displayed within the requesting client device. The modified XML portions are then converted back to HTML format or another originating format of the Web page. The masked portions of the Web page are then unmasked and the Web page with modified content is transmitted to the client device for display therewithin.

The present invention can facilitate tailoring of Web page content in HTML format utilizing more sophisticated XML content tailoring tools. The present invention is advantageous because HTML irregularities can be compensated for and masked out. In essence, the present invention facilitates placing an HTML document into a regular format that can be processed by normal XML tools. Accordingly, the present invention can facilitate bridging the gap between the growing world of XML format content and the relatively mature collection of Web pages in HTML format. The present invention can also allow Web pages having a mixture of HTML and XML formats to be converted to a single format for display within a Web browser.

DETAILED DESCRIPTION OF THE INVENTION

Figure 1:
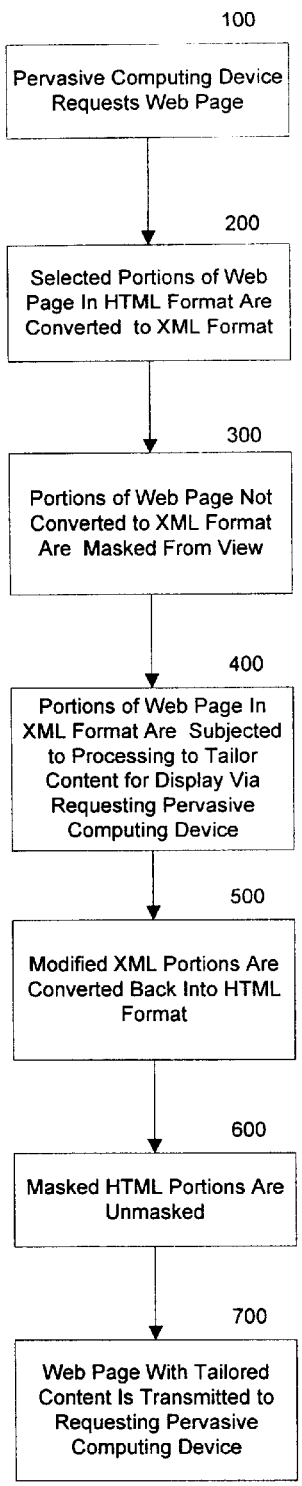
FIG. 1 schematically illustrates operations according to the present invention for modifying Web page content for display via a pervasive computing device.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

HyperText Markup Language (HTML)

HTML utilizes various tags that control format attributes and that identify different portions of a document (i.e., <tag_name>text</tag_name>). Tags are conventionally denoted by the "<>" symbols, with the actual tag between the brackets. Most markup language tags have an opening tag "<tag>" and a closing tag "</tag>." A tag is a singular entity that opens or closes an element. For instance, the <P> HTML tag opens a paragraph element. Likewise, the </P> HTML tag closes a paragraph element. These two tags, plus the content between them, represent the HTML element. A tag is only part of an element, not the element itself. The HTML language is described in the HTML Reference Manual, Jan. 2, 1996, published by Sandia National Laboratories, which is incorporated herein by reference, in its entirety.

Extensible Markup Language (XML)

Extensible Markup Language (XML) is currently a formal recommendation from the World Wide Web Consortium as a way to make the Web a more versatile tool. XML is similar to HTML in that both languages are subsets of Standard Generalized Markup Language (SGML) and that both utilize tags to describe the contents of a page or file. HTML, however, describes the content of a Web page (mainly text and graphic images) only in terms of how content is to be displayed and interacted with. XML describes the content in terms of what data is being described. For example, a <PHONENUM> tag could indicate that the data following the tag is a phone number. This means that an XML file can be processed purely as data by a program or it can be stored with similar data on another computer or, like an HTML file, that it can be displayed. For example, depending on how the application program in the receiving computer wanted to handle the phone number, it could be stored, displayed, or dialed. XML is "extensible" because, unlike HTML, XML markup tags can be unlimited and can be self-defining.

The structure of an XML document is essentially a tree. The root element is the top-level element, and its descendants (i.e., the other elements) branch out from there. XML parsers are applications that examine XML code and report forming errors. An XML parser reads XML files, generates a hierarchically structured tree, and then hands off data to viewers and other applications for processing.

Document Type Definitions (DTDs) may accompany an XML document, essentially defining the rules of the XML document, such as which elements are present and the structural relationship between the elements. DTDs can help validate data when a receiving application does not have a built-in description of the incoming XML data. With XML, however, DTDs are optional.

Extensible Stylesheet Language (XSL)

Extensible Stylesheet Language (XSL) is a transformation language that defines rules for mapping structured XML data to HTML, or other display formats, using an XSL Processor. Currently the XSL standard is in the working group phase at the World Wide Web Consortium and is still under development. XSL provides a superset of the Cascading Style Sheets (CSS) language functionality and allows developers to build a presentation structure that is different from the data structure. For instance, XSL can be used to transform an XML document into a bulleted list in one HTML view, and into a footnote in a second HTML view.

Web Page Content Tailoring

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth. The program code may execute entirely on a Web server, or it may execute partly on a Web server and partly on a remote computer (i.e., a user's Web client), or as a proxy at an intermediate point in the network. In the latter scenario, the remote computer may be connected to the Web server through a LAN or a WAN, or the connection may be made through the Internet (e.g., via an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart-block or blocks.

Referring now to FIG. 1, operations according to the present invention for tailoring content within a Web page are illustrated. A Web page is requested by a client device, such as a pervasive computing device (Block 100). The requested Web page contains at least one portion in HTML format that can be converted into XML format and that requires some amount of content tailoring to properly display the Web page within the client device. The requested Web page may also contain one or more portions that cannot be converted into XML format, or that do not require content tailoring.

Portions of the Web page for which content tailoring is to be performed are converted from HTML format to XML format (Block 200). HTML-to-XML transformation may be performed by parsing the selected portions of the HTML content and reformatting the HTML content as well-formed XML content. In this process, important characteristics of the HTML content are extracted and an XML version of the content is generated. HTML, in many cases, does not meet the requirements of well-formed XML that many XML tools assume. For example, the following HTML statement is not well-formed:

<img src="http://host1/pic1.gif" width="100" height=100>

A "/" would be required before the last ">" for this statement to meet XML's well-formed criteria. In many HTML documents, this "/" is omitted. Furthermore, there are many common inconsistencies with how HTML is written. As shown in the above example, some attributes such as the width attribute shown above are delimited by quotes and some attributes such as the height attribute are not delimited by them. Finally, some XML parsing tools may be better suited for processing elements as opposed to processing attributes. HTML-to-XML transformation performed according to the present invention would produce the following well-formed XML code:

<IMG>
<SRC>http://host1/pic1.gif</SRC>
<WIDTH>100</WIDTH>
<HEIGHT>100</HEIGHT>
</IMG>

The above XML code is well-formed. Attributes have been upgraded to elements, and inconsistencies associated with the attributes have been removed.

Portions of the Web page that cannot be converted into XML format, or that do not require content tailoring, as decided by an application developer, are masked from view (Block 300). The purpose of masking is to insure that an HTML tag cannot be interpreted as an XML tag by a XML parsing tool. This can be achieved by encoding the "<" and ">" tag delimiters as distinct, reserved character strings. For example, "<" might be encoded as "__pvclt__" and similarly ">" might be encoded as "__pvcgt__". Other problematic characters such as quotes, apostrophes, and ampersands can be handled in an analogous manner. For example, the HTML tag "<p>" could be masked by generating and replacing the HTML tag "<p>" with the following code: "__pvclt__p__pvcgt__".

The portions converted to XML format are then modified for display within the client device using one or more XML content tailoring tools (Block 400). Exemplary content tailoring approaches include the XSL stylesheet processor and the Simple API for XML (SAX), which are well known to those skilled in this art. For example, the following XML-formatted content includes an image "pic1.gif":

<IMG>
<SRC>http://host1/pic1.gif </SRC>
<WIDTH>100</WIDTH>
<HEIGHT>100</HEIGHT>
</IMG>

It may be desirable to shrink the amount of screen canvas allocated to the image "pic1.gif". This could be accomplished by tailoring the above XML by modifying the width and height elements to have reduced values. Thus, a content tailored version of the above HTML content might be as follows:

<IMG>
<SRC>http://host1/pic1.gif </SRC>
<WIDTH>50</WIDTH>
<HEIGHT>50</HEIGHT>
</IMG>.

The modified portions of the Web page are then converted from XML format to HTML format (Block 500). XML-to-HMTL transformation is typically performed by an XML content tailoring tool during a final processing phase whereby the masked HTML portions of the Web page are then unmasked (Block 600), and the Web page with tailored content is transmitted to the client device for display there within (Block 700). Unmasking is performed by replacing the reserved character string encodings with the problematic characters (i.e., "<", ">", etc.) they represented. Thus, the masked tag "__pvclt_p_pvcgt__" would be replaced with the original HTML tag "<p>".

Figure 2:
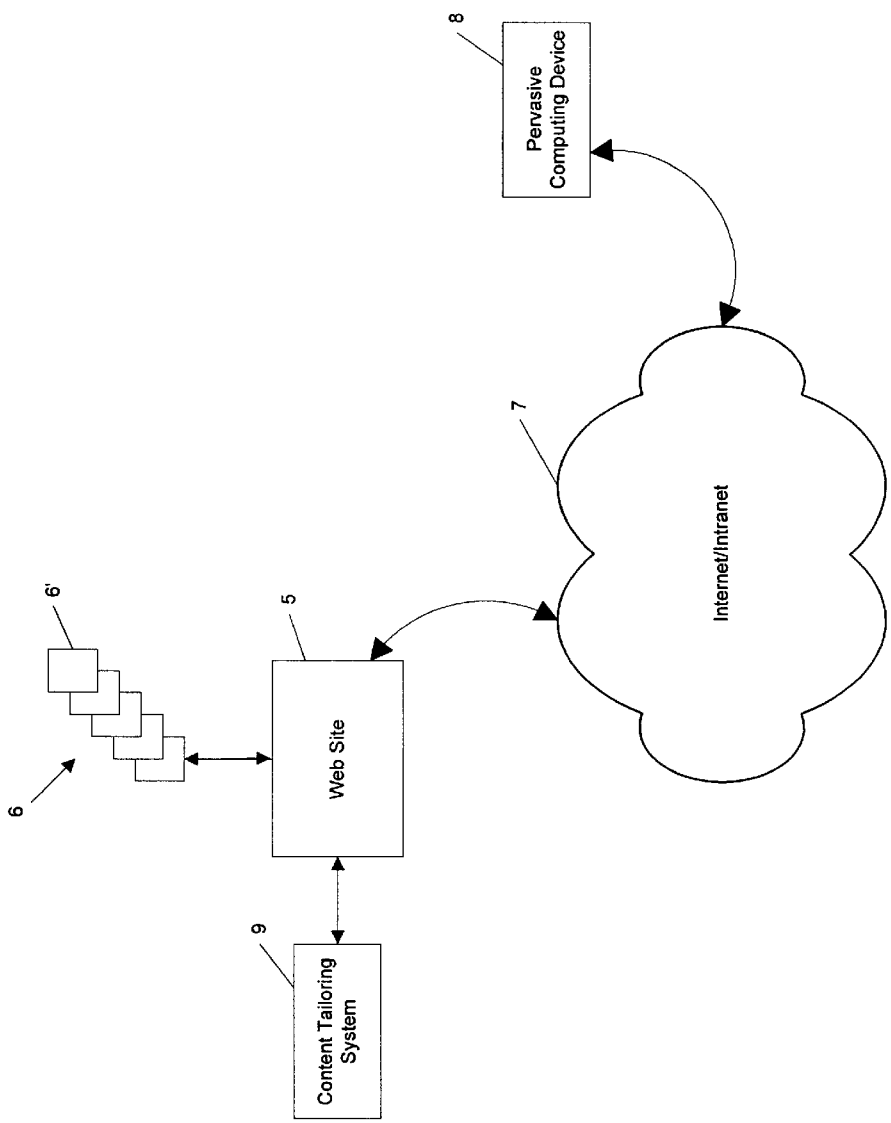
FIG. 2 schematically illustrates a system for carrying out the present invention.

Referring now to FIG. 2, a system for carrying out aspects of the present invention is schematically illustrated. A Web site 5 containing Web pages 6 is connected to a computer network 7, such as the Internet or an intranet. A pervasive computing device 8 is configured to communicate with, and receive Web pages 6 from, the Web site 5 via the computer network 7. A system 9 for tailoring content within requested Web pages, according to the present invention, is in communication with the Web site 5 as illustrated. It is understood that the content tailoring system 9 could be configured to communicate with the Web site 5 via the Internet 7 or via another computer network. In addition, functions of the content tailoring system 9 may be performed by a processor within the Web site 5 or by another data processor in communication with the Web site 5.

The content tailoring system 9 is configured to perform various operations described above with respect to FIG. 1. For example, the content tailoring system 9 can convert portions of a requested Web page from HTML format to XML format (Block 200, FIG. 1) and can mask other Web page content portions (Block 300, FIG. 1). The content tailoring system 9 also can employ content tailoring tools, as described above, to modify Web page portions in XML format (Block 400, FIG. 1). The content tailoring system 9 also converts the modified portions in XML format back into HTML format (Block 500, FIG. 1) and unmasks masked portions of the Web page (Block 600, FIG. 1).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the s recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of tailoring Web page content for display via a client device, wherein the Web page contains first and second content portions in HyperText Markup Language (HTML) format, the method comprising the following steps:
   receiving a request from the client device for the Web page;
   converting the first content portion from HTML format to XML format;
   masking the second content portion from view of the content tailoring tool;
   modifying the converted first content portion for display within the client device using a content tailoring tool in XML format; and
   converting the modified first content portion from XML format to HTML format.

2. A method according to claim 1 further comprising the step of transmitting the Web page containing the modified first content portion to the client device for display therewithin.

3. A method according to claim 1 further comprising the step of unmasking the second content portion prior to the step of transmitting the Web page containing the modified first content portion to the client device.

4. A method according to claim 1 wherein the Web page contains a third content portion in HTML format that does not require modification for display within the client device, and further comprising the step of masking the third content portion from view of the content tailoring tool prior to the step of modifying the converted first content portion.

5. A method according to claim 4 further comprising the step of unmasking the third content portion prior to the step of transmitting the Web page containing the modified first content portion to the client device.

6. A method according to claim 1 wherein the step of modifying the converted first content portion for display within the client device is performed via an XML parser.

7. A method according to claim 1 wherein the step of modifying the converted first content portion for display within the client device is performed via an Extensible Style Language (XSL) processor.

8. A method according to claim 1 wherein the client device is a pervasive computing device.

9. A method of tailoring Web page content for display via a client device, wherein the Web page contains a first content portion in HyperText Markup Language (HTML) format that can be converted into Extensible Markup Language (XML) format, and a second content portion in HTML format that is difficult to convert into XML format, the method comprising the following steps:
   receiving a request from the client device for the Web page;

converting the first content portion from HTML format to XML format;

masking the second content portion from view of an XML content tailoring tool;

modifying the converted first content portion for display within the client device using an XML content tailoring tool;

converting the modified first content portion from XML format to HTML format;

unmasking the second content portion; and transmitting the Web page containing the modified first content portion to the client device for display therewithin.

10. A method according to claim 9 wherein the Web page contains a third content portion in HTML format that does not require modification for display within the client device, and further comprising the step of masking the third content portion from view of the XML content tailoring tool prior to the step of modifying the converted first content portion of the Web page.

11. A method according to claim 10 further comprising the step of unmasking the third content portion prior to the step of transmitting the Web page containing the modified first content portion to the client device.

12. A method according to claim 10 wherein the step of modifying the converted first content portion for display within the client device is performed via an XML parser.

13. A method according to claim 10 wherein the step of modifying the converted first content portion for display within the client device is performed via an Extensible Style Language (XSL) processor.

14. A method according to claim 10 wherein the client device is a pervasive computing device.

15. A system for tailoring Web page content for display via a client device, wherein the Web page contains first and second content portions in HyperText Markup Language (HTML) format, comprising:

means for receiving a request from the client device for the Web page;

means for converting t he first content portion from HTML format to XML format;

means for masking the second content portion from view of the content tailoring tool;

means for modifying the converted first content portion for display within the client device using a content tailoring tool in XML format; and means for converting the modified first content portion from XML format to HTML format.

16. A system according to claim 15 further comprising means for transmitting the Web page containing the modified first content portion to the client device for display therewithin.

17. A system according to claim 15 further comprising means for unmasking the second content portion prior to transmitting the Web page containing the modified first content portion to the client device.

18. A system according to claim 15 wherein the Web page contains a third content portion in HTML format that does not require modification for display within the client device, and further comprising means for masking the third content portion from view of the content tailoring tool prior to modification of the converted first content portion.

19. A system according to claim 18 further comprising means for unmasking the third content portion prior to the transmission of the Web page containing the modified first content portion to the client device.

20. A system according to claim 15 wherein the means for modifying the converted first content portion for display within the client device comprises an XML parser.

21. A system according to claim 15 wherein the means for modifying the converted first content portion for display within the client device comprises an Extensible Style Language (XSL) processor.

22. A system according to claim 15 wherein the client device is a pervasive computing device.

23. A system for tailoring Web page content for display via a client device, wherein the Web page contains a first content portion in HyperText Markup Language (HTML) format that can be converted into Extensible Markup Language (XML) format, and a second content portion in HTML format that is difficult to convert into XML format, comprising:

means for receiving a request from the client device for the Web page;

means for converting the first content portion from HTML format to XML format;

means for masking the second content portion from view of an XML content tailoring tool;

means for modifying the converted first content portion for display within the client device using an XML content tailoring tool;

means for converting the modified first content portion from XML format to HTML format;

means for unmasking the second content portion; and means for transmitting the Web page containing the modified first content portion to the client device for display therewithin.

24. A system according to claim 23 wherein the Web page contains a third content portion in HTML format that does not require modification for display within the client device, and further comprising means for masking the third content portion from view of the XML content tailoring tool prior to modification of the converted first content portion of the Web page.

25. A system according to claim 24 further comprising means for unmasking the third content portion prior to transmission of the Web page containing the modified first content portion to the client device.

26. A system according to claim 24 wherein the means for modifying the converted first content portion for display within the client device comprises an XML parser.

27. A system according to claim 24 wherein the means for modifying the converted first content portion for display within the client device comprises an Extensible Style Language (XSL) processor.

28. A system according to claim 24 wherein the client device is a pervasive computing device.

29. A computer program product for tailoring Web page content for display via a client device, wherein the Web page contains first and second content portions in HyperText Markup Language (HTML) format, the computer program product comprising a computer usable storage medium having computer readable program code means embodied in the medium, the computer readable program code means comprising:

computer readable program code means for receiving a request from the client device for the Web page;

computer readable program code means for converting the first content portion from HTML format to XML format;

computer readable program code means for masking the second content portion from view of the content tailoring tool;

computer readable program code means for modifying the converted first content portion for display within the client device using a content tailoring tool in XML format; and computer readable program code means for converting the modified first content portion from XML format to HTML format.

30. A computer program product according to claim 29 further comprising computer readable program code means for transmitting the Web page containing the modified first content portion to the client device for display therewithin.

31. A computer program product according to claim 29 further comprising computer readable program code means for unmasking the second content portion prior to transmitting the Web page containing the modified first content portion to the client device.

32. A computer program product according to claim 29 wherein the Web page contains a third content portion in HTML format that does not require modification for display within the client device, and further comprising computer readable program code means for masking the third content portion from view of the content tailoring tool prior to modification of the converted first content portion.

33. A computer program product according to claim 32 further comprising computer readable program code means for unmasking the third content portion prior to the transmission of the Web page containing the modified first content portion to the client device.

34. A computer program product according to claim 29 wherein the computer readable program code means for modifying the converted first content portion for display within the client device comprises an XML parser.

35. A computer program product according to claim 29 wherein the computer readable program code means for modifying the converted first content portion for display within the client device comprises an Extensible Style Language (XSL) processor.

36. A computer program product according to claim 29 wherein the client device is a pervasive computing device.

37. A computer program product for tailoring Web page content for display via a client device, wherein the Web page contains a first content portion in HyperText Markup Language (HTML) format that can be converted into Extensible Markup Language (XML) format, and a second content portion in HTML format that is difficult to convert into XML format, the computer program product comprising a computer usable storage medium having computer readable program code means embodied in the medium, the computer readable program code means comprising:

computer readable program code means for receiving a request from the client device for the Web page;

computer readable program code means for converting the first content portion from HTML format to XML format;

computer readable program code means for masking the second content portion from view of an XML content tailoring tool;

computer readable program code means for modifying the converted first content portion for display within the client device using an XML content tailoring tool;

computer readable program code means for converting the modified first content portion from XML format to HTML format;

computer readable program code means for unmasking the second content portion; and computer readable program code means for transmitting the Web page containing the modified first content portion to the client device for display therewithin.

38. A computer program product according to claim 37 wherein the Web page contains a third content portion in HTML format that does not require modification for display within the client device, and further comprising computer readable program code means for masking the third content portion from view of the XML content tailoring tool prior to modification of the converted first content portion of the Web page.

39. A computer program product according to claim 38 further comprising computer readable program code means for unmasking the third content portion prior to transmission of the Web page containing the modified first content portion to the client device.

40. A computer program product according to claim 38 wherein the computer readable program code means for modifying the converted first content portion for display within the client device comprises an XML parser.

41. A computer program product according to claim 38 wherein the computer readable program code means for modifying the converted first content portion for display within the client device comprises an Extensible Style Language (XSL) processor.

42. A computer program product according to claim 40 wherein the client device is a pervasive computing device.

* * * * *

UNITED STATES PATENT AND TRADEMARK OFFICE
CERTIFICATE OF CORRECTION

PATENT NO. : 6,535,896 B2
DATED : March 18, 2003
INVENTOR(S) : Britton et al.

It is certified that error appears in the above-identified patent and that said Letters Patent is hereby corrected as shown below:

Column 12,
Line 44, should read -- 42. A computer program product according to claim 37 --

Signed and Sealed this

Ninth Day of December, 2003

JAMES E. ROGAN
*Director of the United States Patent and Trademark Office*